United States Patent
Nakano et al.

(10) Patent No.: US 12,103,616 B2
(45) Date of Patent: Oct. 1, 2024

(54) STEERING CONTROL DEVICE, STEERING CONTROL METHOD, AND STEERING CONTROL SYSTEM

(71) Applicant: Hitachi Astemo, Ltd., Hitachinaka (JP)

(72) Inventors: Hiroshi Nakano, Hitachinaka (JP); Tomoaki Fujibayashi, Hitachinaka (JP); Kazuya Takahashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 266 days.

(21) Appl. No.: 17/291,892

(22) PCT Filed: Oct. 30, 2019

(86) PCT No.: PCT/JP2019/042552
§ 371 (c)(1),
(2) Date: May 6, 2021

(87) PCT Pub. No.: WO2020/095788
PCT Pub. Date: May 14, 2020

(65) Prior Publication Data
US 2022/0001921 A1    Jan. 6, 2022

(30) Foreign Application Priority Data
Nov. 7, 2018    (JP) .................................. 2018-209977

(51) Int. Cl.
*B62D 6/00*    (2006.01)
*B62D 13/00*    (2006.01)

(52) U.S. Cl.
CPC ............. *B62D 6/003* (2013.01); *B62D 13/00* (2013.01)

(58) Field of Classification Search
CPC ............................... B62D 13/00; B62D 6/003
See application file for complete search history.

(56) References Cited

U.S. PATENT DOCUMENTS

| 5,289,892 A | 3/1994 | Notsu |
| 6,523,911 B1 | 2/2003 | Rupp et al. |

(Continued)

FOREIGN PATENT DOCUMENTS

| DE | 41 27 750 C1 | 9/1992 |
| DE | 198 438 26 A1 | 3/2000 |

(Continued)

OTHER PUBLICATIONS

WIPO Translation of JP-2019156066-A (Year: 2019).*

(Continued)

*Primary Examiner* — Jason Holloway
*Assistant Examiner* — Christopher A Buksa
(74) *Attorney, Agent, or Firm* — Crowell & Moring LLP

(57) ABSTRACT

In a steering control device, method, and system, a command is calculated for generating a periodical yaw moment having a phase opposite to oscillating motion based on information on oscillating motion which occurs in a vehicle combination composed of a vehicle and a trailer, and based on the calculated command, a first steering angle command for controlling a steering angle of the front wheels of the vehicle is output to a front wheel steering control unit and a second steering angle command for controlling a steering (Continued)

angle of the rear wheels of the vehicle is output to a rear wheel steering control unit, so that the oscillating motion can be suppressed.

9 Claims, 8 Drawing Sheets

(56) References Cited

U.S. PATENT DOCUMENTS

| | | | |
|---|---|---|---|
| 6,600,974 | B1 | 7/2003 | Traechtler |
| 2006/0206253 | A1* | 9/2006 | Yu .......................... B62D 6/002 701/70 |
| 2016/0229394 | A1 | 8/2016 | Fujii et al. |

FOREIGN PATENT DOCUMENTS

| | | |
|---|---|---|
| DE | 199 64 048 A1 | 1/2001 |
| DE | 10 2014 211 268 A1 | 12/2015 |
| JP | 4-56580 U | 5/1992 |
| JP | 8-150951 A | 6/1996 |
| JP | 2005-41385 A | 2/2005 |
| JP | 2006-21769 A | 1/2006 |
| JP | 2010-42759 A | 2/2010 |
| JP | 2015-58832 A | 3/2015 |
| JP | 2017-218079 A | 12/2017 |
| JP | 2018158673 A * | 10/2018 |
| JP | 2019156066 A * | 9/2019 |

OTHER PUBLICATIONS

WIPO Translation of JP-2010042759-A (Year: 2010).*
WIPO English translation of JP 2018158673 (Year: 2018).*
German-language Office Action issued in German Application No. 11 2019 005 571.2 dated May 11, 2022 with English translation (10 pages).
International Preliminary Report on Patentability (PCT/IB/338 & PCT/IB/373) issued in PCT Application No. PCT/JP2019/042552 dated May 20, 2021, including English translation of document C2 (German-language Written Opinion (PCT/ISA/237) filed on May 6, 2021) (11 pages).
International Search Report (PCT/ISA/210) issued in PCT Application No. PCT/JP2019/042552 dated Dec. 24, 2019 with English translation (five (5) pages).
Japanese-language Written Opinion (PCT/ISA/237) issued in PCT Application No. PCT/JP2019/042552 dated Dec. 24, 2019 (three (3) pages).
German-language Office Action issued in German Application No. 11 2019 005 571.2 C5 dated Aug. 23, 2023 with English translation (12 pages).

* cited by examiner

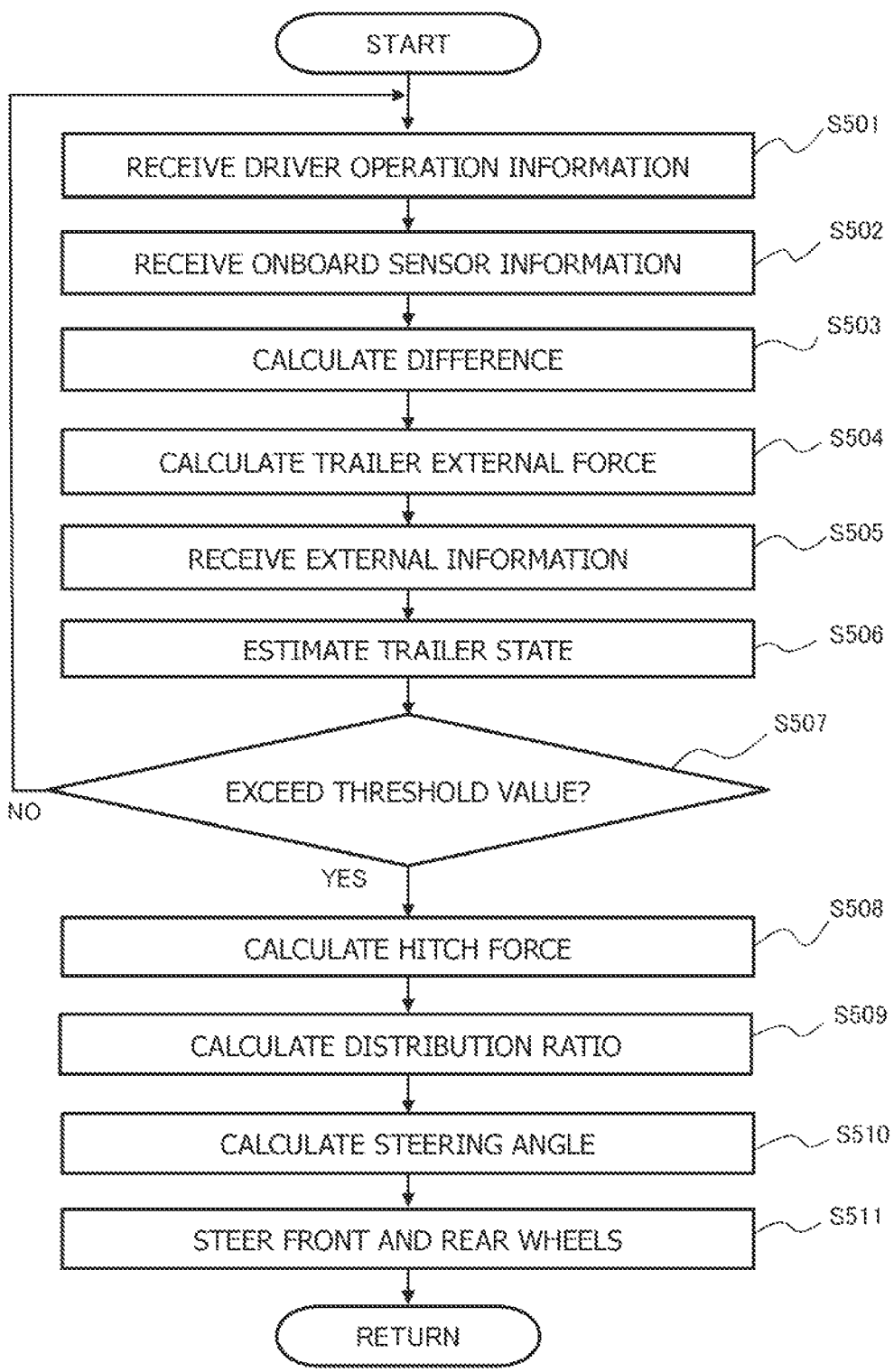

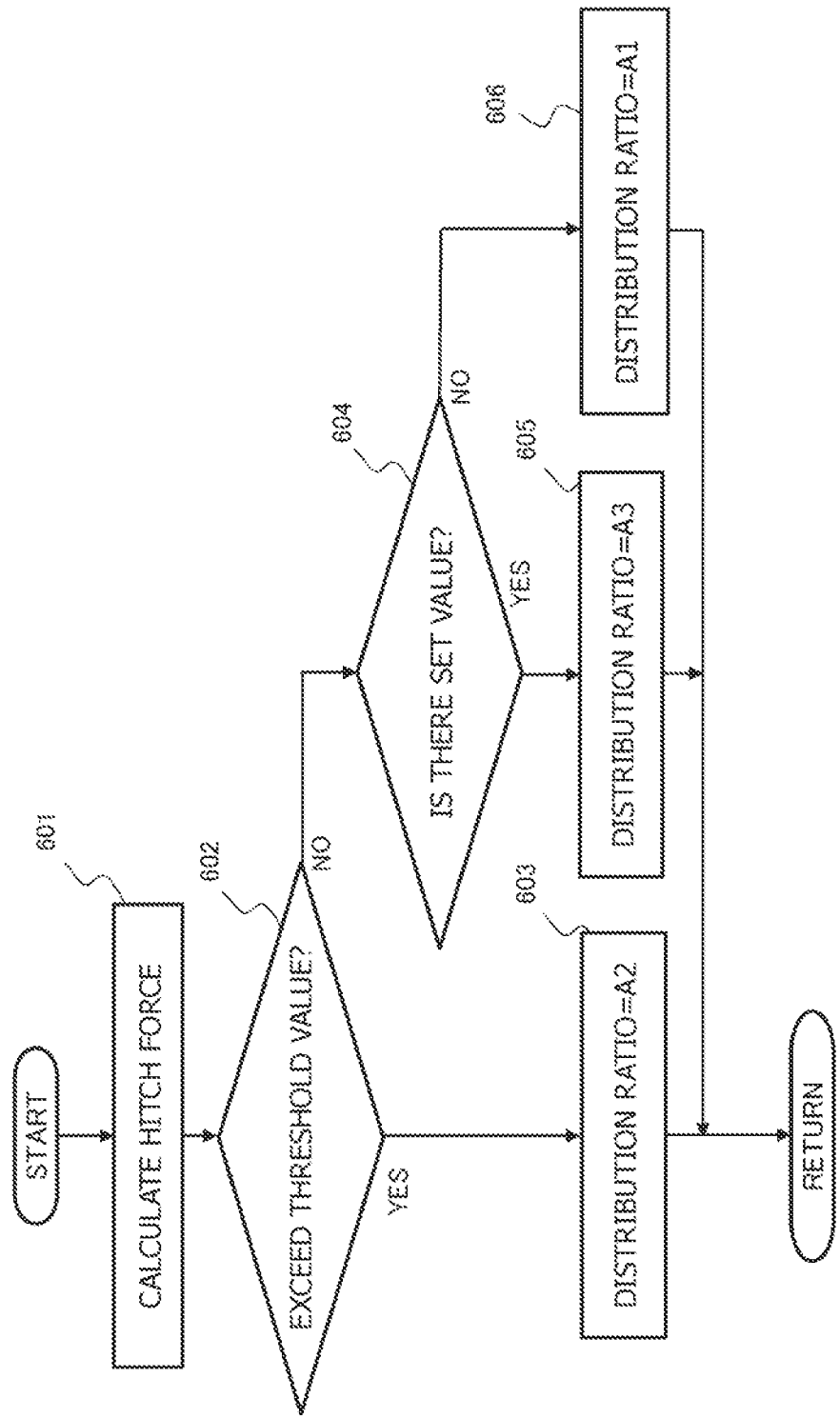

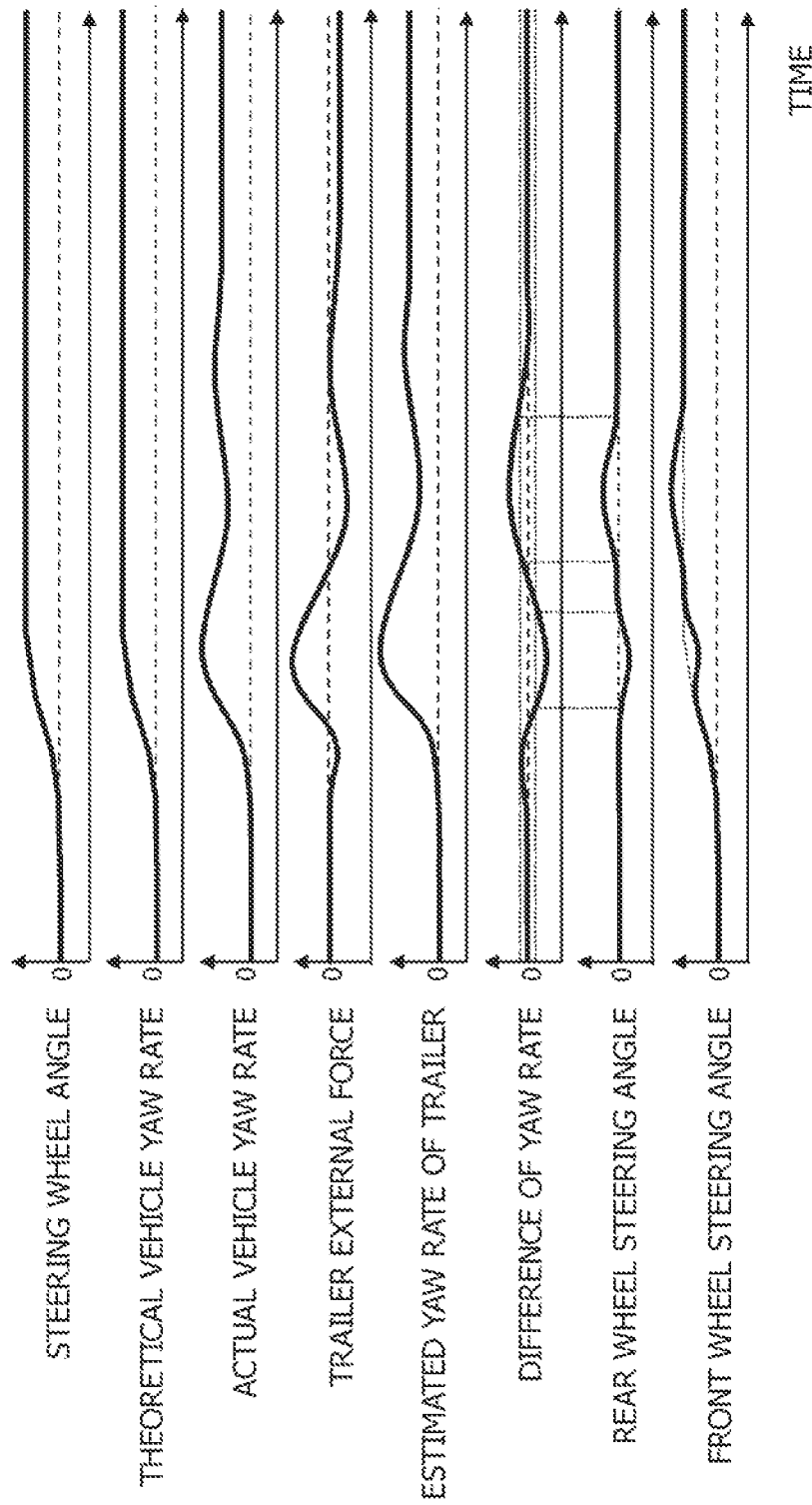

STEERING CONTROL DEVICE, STEERING CONTROL METHOD, AND STEERING CONTROL SYSTEM

TECHNICAL FIELD

The present invention relates to a steering control device, a steering control method, and a steering control system for controlling steering of a vehicle towing a trailer.

BACKGROUND ART

Patent Document 1 discloses a method for stabilizing a vehicle by generating a periodic yaw moment having a phase opposite to the oscillating motion with an automatic braking operation, when an oscillating motion occurs in a vehicle combination composed of a towing vehicle and a trailer.

REFERENCE DOCUMENT LIST

Patent Document

Patent Document 1: JP 2006-021769 A

SUMMARY OF THE INVENTION

Problem to be Solved by the Invention

However, since yaw moment that can be generated by automatic braking of a towing vehicle is not sufficient for a large trailer, the oscillating motion may not be effectively suppressed.

Furthermore, vehicle speed may problematically vary because of the brake operations for suppressing the oscillating motion.

The present invention has been made in view of the conventional problem, and an object of the present invention is to provide a steering control device, a steering control method, and a steering control system capable of suppressing oscillating motion even when a towing vehicle is coupled to a large trailer, while suppressing vehicle speed changes.

Means for Solving the Problem

According to the present invention, in one aspect thereof, a command for generating a periodic yaw moment having a phase opposite to the oscillating motion which occurs in a vehicle combination composed of a towing vehicle and a trailer, is output to a steering device that controls the steering angles of front and rear wheels of the towing vehicle.

Effects of the Invention

According to the present invention, it is possible to suppress the oscillating motion even when a large trailer is coupled to the towing vehicle, while suppressing the towing vehicle speed changes.

BRIEF DESCRIPTION OF THE DRAWINGS

FIG. 6 is a flowchart of a procedure of trailer stabilization control.

FIG. 7 is a flowchart of a setting procedure of a front-rear steering distribution ratio in the trailer stabilization control.

FIG. 8 a time chart of examples of changes in a steering angle, a yaw rate, and trailer external force in the trailer stabilization control.

MODE FOR CARRYING OUT THE INVENTION

Hereinafter, embodiments of a steering control device, a steering control method, and a steering control system according to the present invention will be described with reference to the drawings.

Figure 1:
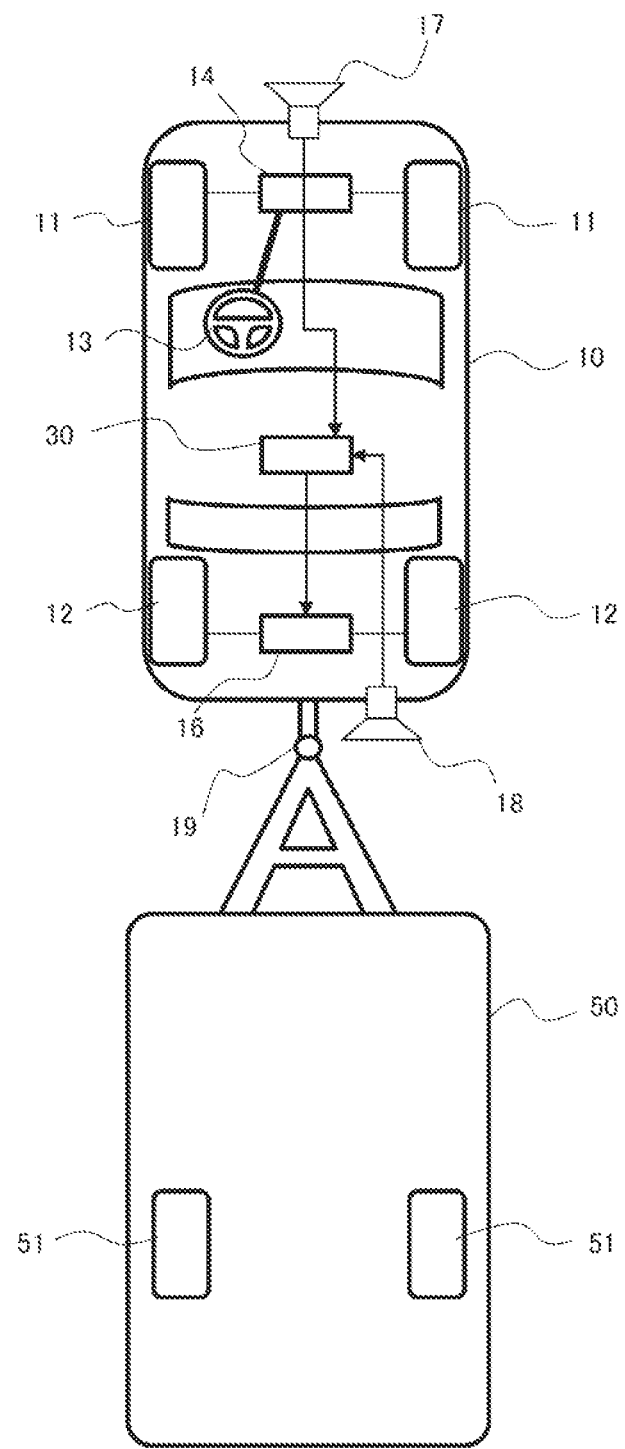
FIG. 1 is a schematic configuration view of a steering control system.

FIG. 1 is a schematic configuration view of a steering control system.

In FIG. 1, a vehicle 10 is a towing vehicle (tractor) which tows a trailer 50 (towed vehicle), and vehicle 10 and trailer 50 are coupled by a hitch portion 19 (coupler) including, for example, a hitch ball, and a hitch coupler.

Vehicle 10 is a four-wheeled vehicle including a pair of left and right front wheels 11, 11 and a pair of left and right rear wheels 12, 12.

Furthermore, vehicle 10 is provided with: a front wheel steering device 14 for operating the steering angle of front wheels 11, 11 based on the input of a steering wheel 13 a driver operates and a command transmitted from a steering control device (steering control unit) 30; and a rear wheel steering device 16 including an operating actuator for operating the steering angle of rear wheels 12, 12 based on the command transmitted from steering control device 30.

Steering control device 30 is an electronic control device which includes a microcomputer having an MPU (microprocessor unit), a ROM (read only memory), a RAM (random access memory), and the like.

Front wheel steering device 14 is a steer-by-wire steering device capable of independently adjusting the steering angle of front wheels 11, 11 in response to the operation of steering wheel 13 by the driver.

For example, front wheel steering device 14 is a steer-by-wire steering system without mechanical connection between steering wheel 13 and front wheels 11, 11, and the steer-by-wire steering system is provided with a steering actuator for steering front wheels 11, 11, a steering reaction force actuator for transmitting a steering reaction force to the driver, and a controller. In the steer-by-wire steering system, the controller controls the steering actuator and the steering reaction force actuator according to a steering angle command based on angle information (angle signal) of steering wheel 13.

Vehicle 10 is provided with a first external sensor 17 for sensing a cruising lane and an obstacle in front of vehicle 10, and a second external sensor 18 for sensing an obstacle and trailer 50 behind vehicle 10.

First external sensor 17 and second external sensor 18 (external sensing units) include, for example, a monocular camera and an image processing unit for processing an image captured by the monocular camera, and obtain sensing information such as a cruising lane, an obstacle, and trailer motion by processing the captured image.

Furthermore, first external sensor 17 and second external sensor 18 can obtain sensing information such as a cruising lane, an obstacle, and trailer motion by a shape sensing device such as stereo camera or a laser radar.

In the vehicle combination composed of vehicle 10 (tractor) and trailer 50, oscillating motion (or pendulum motion) may occur during travelling due to effects of excessive speeds, irregular road surfaces, crosswind, and the like.

Furthermore, when the oscillating motion occurs in the vehicle combination, trailer 50 vibrates around its vertical axis and the vibration is transmitted to vehicle 10 via hitch portion 19, so that stability of the vehicle combination may be lost.

In view of the above, steering control device 30 receives some information of the oscillating motion which occurs in the vehicle combination composed of vehicle 10 and trailer 50, based on the received information, calculates a command for generating a periodic yaw moment having a phase opposite to the oscillating motion, and based on the calculated command, calculates a first steering angle command for controlling the steering angle of front wheels 11, 11 and a second steering angle command for controlling the steering angle of rear wheels 12, 12, and furthermore, performs trailer stabilization control to output the first steering angle command to front wheel steering device 14 (front wheel steering control unit) and to output the second steering angle command to rear wheel steering device 16 (rear wheel steering control unit). According to the trailer stabilization control, the oscillating motion is suppressed and the vehicle combination is stabilized.

Furthermore, steering control device 30 performs the trailer stabilization control by adjusting the distribution of the front wheel steering angle and rear wheel steering angle, and at the same time, steering control device 30 suppresses motional changes in the yaw rotation direction, which is the traveling direction of vehicle 10. Thus, the driver's operational burden may be reduced without the need for corrective steering by the driver.

Information on the oscillating motion which occurs in the vehicle combination composed of vehicle 10 and trailer 50 can be information on the oscillating motion of vehicle 10 only, or information on the oscillating motion of trailer 50 only. Furthermore, steering control device 30 can perform the trailer stabilization control by estimating the oscillating motion based on information other than information on the oscillating motion.

The information on the oscillating motion may include, for example, yaw rates, rolling information, lateral accelerations of trailer 50, forces applied to hitch portion 19 (coupler) and a coupling angle, and yaw rates and lateral accelerations of vehicle 10.

Figure 2:
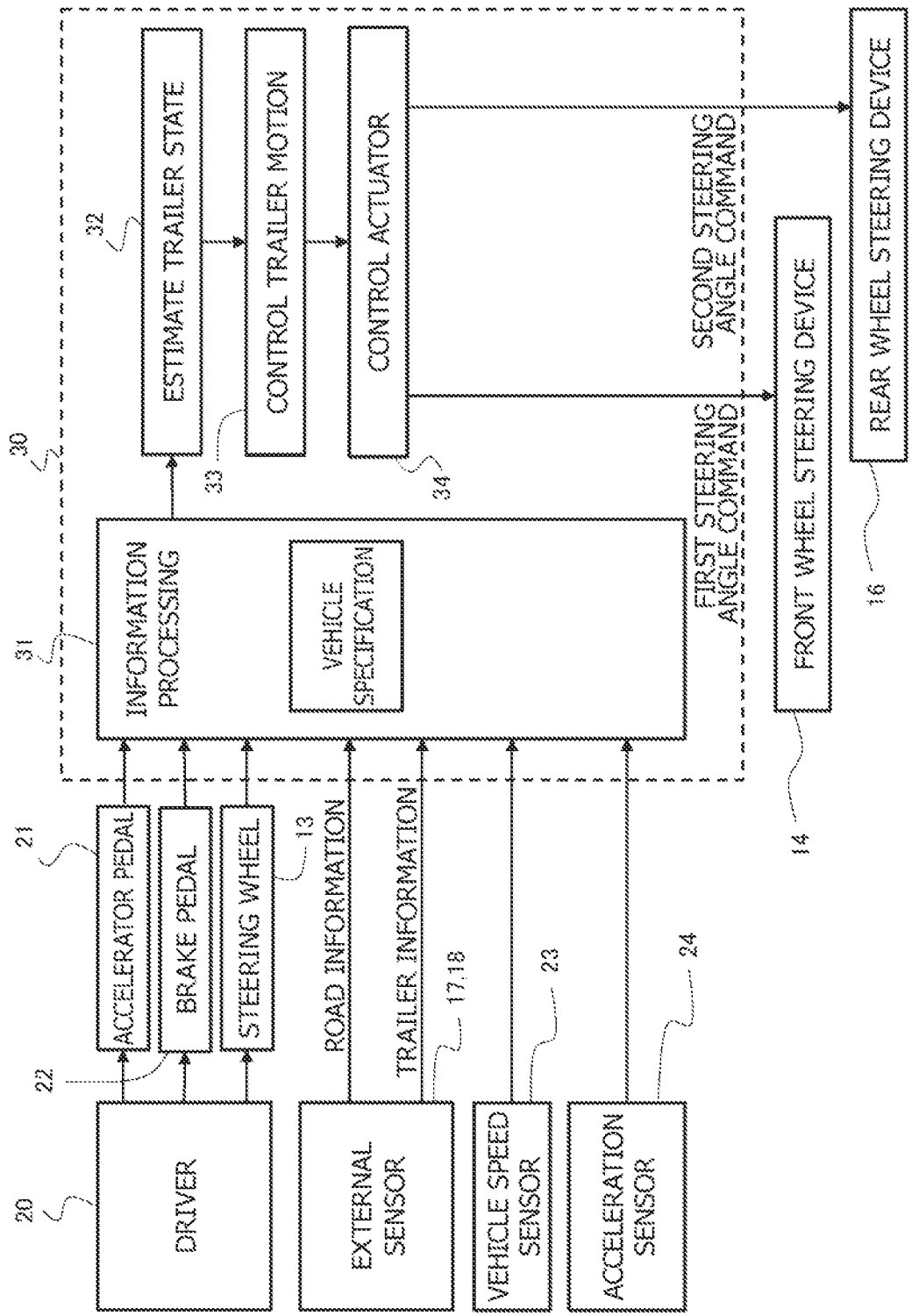
FIG. 2 is a block view of a steering control device.

FIG. 2 is a block view of steering control device 30.

Steering control device 30 receives driver operation information which includes, for example, accelerator opening information AO transmitted from an accelerator pedal 21 driver 20 operates, brake opening information BO transmitted from a brake pedal 22 operated by driver 20, and angle information on steering wheel 13 driver 20 operates.

Steering control device 30 receives information on the cruising lane and obstacles in front of and behind vehicle 10 transmitted from external sensors 17, 18, and information on the motion of trailer 50 behind the vehicle.

Furthermore, steering control device 30 receives information on a vehicle speed V which is a vehicle body speed of vehicle 10 transmitted from a vehicle speed sensor 23, and information on the longitudinal acceleration, the lateral acceleration, and the yaw rate transmitted from an acceleration sensor 24.

For receiving the above various information, steering control device 30 serves as an information processing unit 31, a trailer state estimation unit 32, a trailer motion control unit 33, and an actuator control unit 34.

Information processing unit 31 calculates the motional state of the vehicle combination based on the driver operation information, the external sensing information, the motional state information, and vehicle specification information on vehicle 10 and trailer 50 stored in a memory.

Trailer state estimation unit 32 estimates the motional states of trailer 50 based on the motional state of the vehicle combination calculated in information processing unit 31. Trailer motion control unit 33 generates a control input for stabilizing the motional state of trailer 50 estimated by trailer state estimation unit 32.

In order to implement the control input generated in trailer motion control unit 33, actuator control unit 34 outputs steering angle commands (the first steering angle command and second steering angle command) to steering actuators of front wheel steering device 14 and rear wheel steering device 16 to control the front wheel steering angle and rear wheel steering angle.

Figure 3:
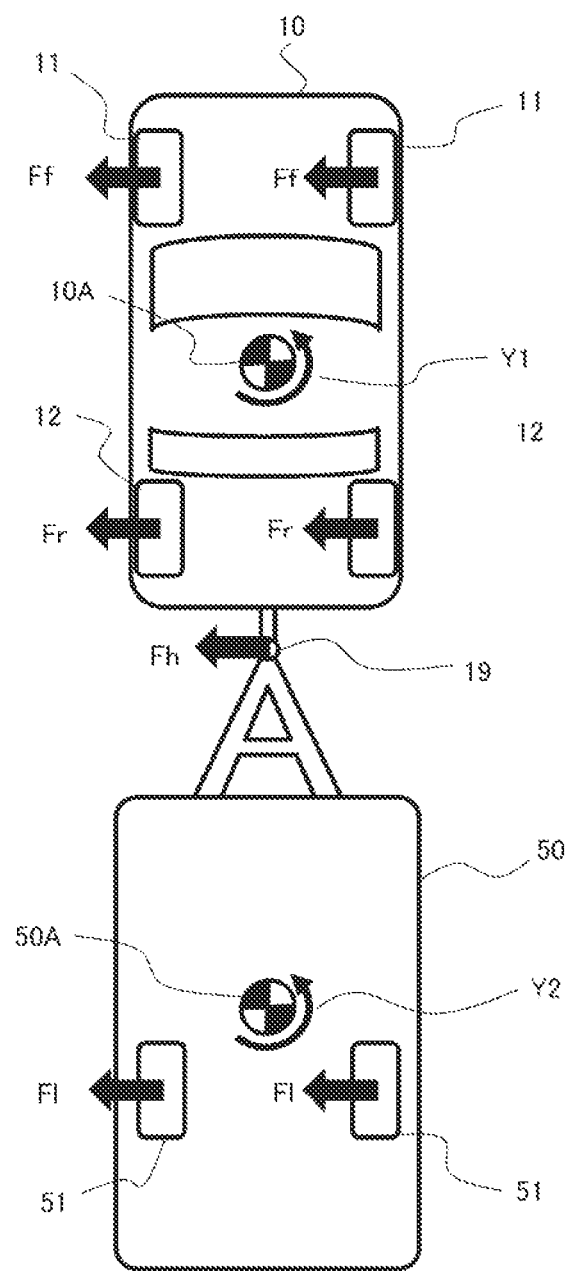
FIG. 3 is a view illustrating motion of a vehicle combination composed of a towing vehicle (tractor) and a trailer.

FIG. 3 is a view illustrating movement of the vehicle combination composed of vehicle (tractor) 10 and trailer 50.

In the vehicle combination composed of vehicle 10 and trailer 50, yaw rotation movement Y1 around the center of gravity 10A of vehicle 10 is generated mainly by force Ff transmitted from the road surface to front wheels 11, 11 of vehicle 10, force Fr transmitted from the road surface to rear wheels 12, 12 of vehicle 10, and force Fh applied to hitch portion 19 from trailer 50 and transmitted to vehicle 10.

Yaw rotation movement Y2 around the center of gravity 50A of trailer 50 is generated mainly by force Fh applied to hitch portion 19 from trailer 50 side and transmitted to vehicle 10, and force Fl transmitted from the road surface to the pair of left and right traveling wheels 51 and 51 of trailer 50.

The magnitudes of force Ff and force Fr in vehicle 10 are determined based on the motional state of vehicle 10 such as a front wheel steering angle $\delta f$, a rear wheel steering angle $\delta r$, a skid angle, and vehicle speed.

Here, when vehicle 10 alone travels instead of the vehicle combination, the yaw rate generated in vehicle 10 by force Ff and force Fr is determined based on the yaw inertia moment of vehicle 10. Thus, steering control device 30 can estimate the yaw rate of vehicle 10 alone by determining force Ff and force Fr based on the motional state of vehicle 10.

Steering control device 30 can estimate force Fh (trailer external force) by comparing the estimated yaw rate when vehicle 10 alone travels and the actual yaw rate that is found in vehicle 10 of the vehicle combination.

When the vehicle specifications of trailer 50 are known, second external sensor 18 measures the yaw motion (yawing) of trailer 50, and then, steering control device 30 can determine the motional state such as a skid angle and vehicle speed of trailer 50, and then, steering control device 30 can estimate force Fl transmitted from the road surface to traveling wheels 51 and 51 of trailer 50.

In view of the above, steering control device 30 can estimate the state such as the yaw rate of trailer 50 by estimating force Fh (trailer external force) applied to hitch portion 19 and force Fl transmitted from the road surface to traveling wheels 51 and 51 of trailer 50.

Furthermore, steering control device 30 controls the front wheel steering angle and rear wheel steering angle of vehicle 10 based on the estimated trailer state to operate force Ff transmitted from the road surface to front wheels 11, 11 and force Fr transmitted from the road surface to rear wheels 12, 12, and furthermore, steering control device 30 suppresses the oscillating motion of the vehicle combination by generating force in a direction suppressing the yaw motion that occurs in trailer 50 by force applied to hitch portion 19.

Here, since the yaw rate that occurs in vehicle 10 and trailer 50 varies periodically due to the oscillating motion of the vehicle combination, the front and rear steering wheel angles by steering control device 30 is controlled to generate the periodical yaw moment having a phase opposite to the oscillating motion.

Furthermore, when a yaw rate sensor or an acceleration sensor is mounted on trailer 50, steering control device 30 can directly obtain force Fl transmitted from the road surface to traveling wheels 51 and 51 of trailer 50 based on the output from the sensor.

Figure 4:
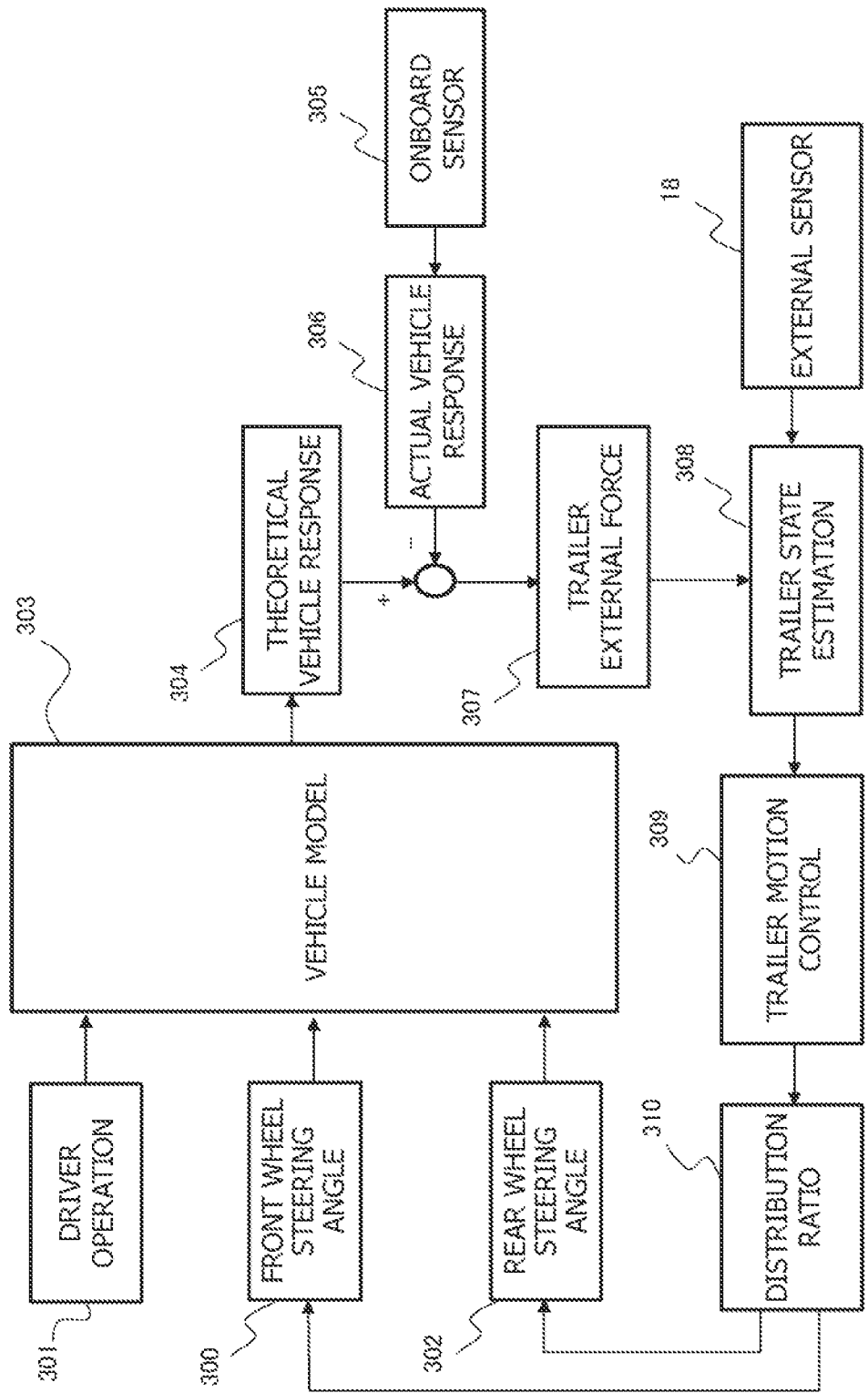
FIG. 4 is a control block view of a steering control device.

FIG. 4 is a control block view of steering control device 30.

First, steering control device 30 inputs, for example, driver operation information 301 such as the accelerator opening information AO, the brake opening information BO, and the steering wheel angle information, and information on a front wheel steering angle 300 and a rear wheel steering angle 302 into a vehicle model 303 based on the vehicle specifications, and then, steering control device 30 calculates a theoretical vehicle response 304 when vehicle 10 travels alone.

Furthermore, steering control device 30 calculates an actual vehicle response 306 based on vehicle motion information (which is information on the motional state of vehicle 10) transmitted from an onboard sensor 305 (vehicle motion state sensing unit) such as vehicle speed sensor 23 and acceleration sensor 24.

Furthermore, steering control device 30 estimates trailer external force 307 (which is force Fh applied to hitch portion 19 from trailer 50 and transmitted to vehicle 10) based on the difference between theoretical vehicle response 304 and actual vehicle response 306.

Moreover, steering control device 30 estimates trailer state 308 such as the force and the yaw moment which are applied to trailer 50 based on trailer external force 307 and the motion of trailer 50 detected by second external sensor 18.

Steering control device 30 calculates the yaw moment that suppresses the yaw motion of trailer 50 by trailer motion control 309, and varies front wheel steering angle 300 and rear wheel steering angle 302 in response to a front-rear steering distribution ratio 310 so as to generate the yaw moment that suppresses the yaw motion of trailer 50.

Here, when the yaw motion which exceeds a threshold value occurs in trailer 50, in other words, when the yaw motion of trailer 50 exceeds an allowable level, steering control device 30 generates the yaw moment that suppresses the yaw motion of trailer 50 by steering front wheels 11, 11 and rear wheels 12, 12, to suppress the yaw motion of trailer 50.

Steering control device 30 can measure the trailer motion by using, for example, a yaw rate sensor or an acceleration sensor, and a sensor for measuring the angle of hitch portion 19, which are mounted on trailer 50.

Furthermore, steering control device 30 reads the driver's intention based on driver operation information 301 to vary the distribution of the front wheel steering and rear wheel steering so as to generate the yaw moment that suppresses the yaw motion of trailer 50 without changing the traveling direction of the vehicle.

Figure 5:
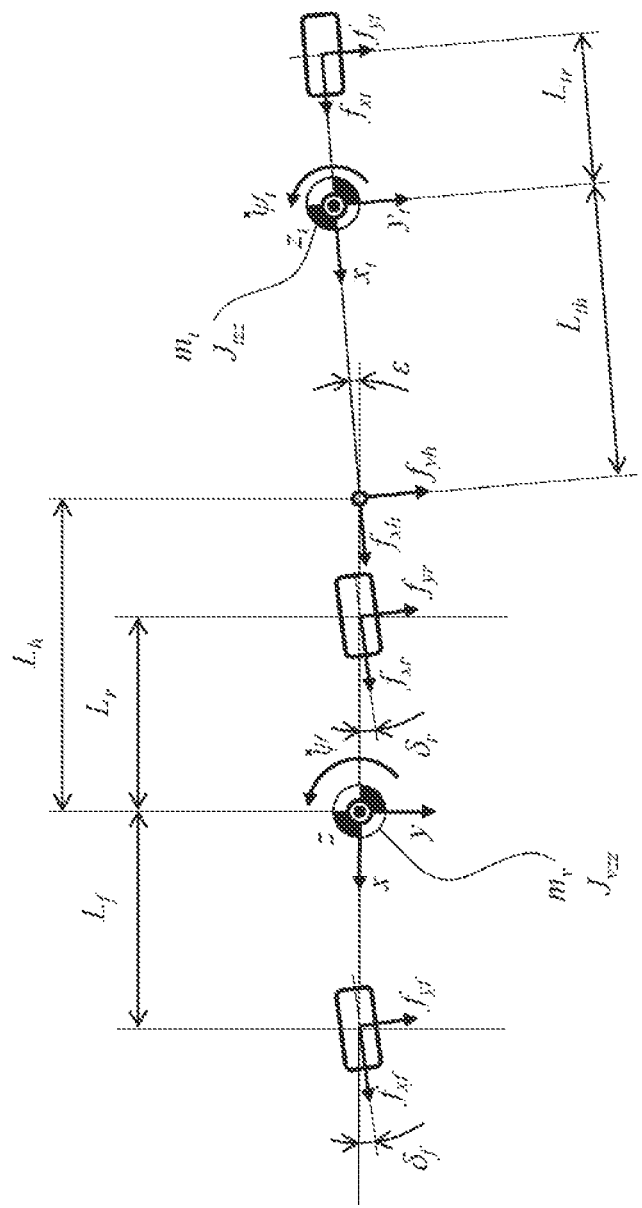
FIG. 5 is a view of each variable in a three-wheeled vehicle model.

FIG. 5 is a view of each variable in a three-wheeled vehicle model.

In FIG. 5, x, y, and z are the coordinate axes of the coordinate system of vehicle 10. In this coordinate system, the positive direction of the coordinate axis x is the front direction of vehicle 10, the positive direction of the coordinate axis y is the left direction of vehicle 10, and the positive direction of the coordinate axis z is the upward direction of vehicle 10.

Furthermore, xt, yt, and zt are the coordinate axes of the coordinate system of trailer 50. In this coordinate system, the positive direction of the coordinate axis xt is the front direction of trailer 50, the positive direction of the coordinate axis yt is the left direction of trailer 50, and the positive direction of the coordinate axis zt is the upward direction of trailer 50.

Lf is the distance between front wheels 11, 11 and the center of gravity 10A of vehicle 10, Lr is the distance between rear wheels 12, 12 and the center of gravity 10A of vehicle 10, Lh is the distance between hitch portion 19 and the center of gravity 10A of vehicle 10, Lth is the distance between hitch portion 19 and the center of gravity 50A of trailer 50, and Ltr is the distance between traveling wheels 51, 51 of trailer 50 and the center of gravity 50A of trailer 50.

Furthermore, mv is the mass of vehicle 10, Jvzz is the yaw inertia moment of the vehicle 10, $\varphi$ is the yaw angle of vehicle 10 ($\dot{\varphi}$ is the yaw angle velocity), mt is the mass of trailer 50, Jtzz is the yaw inertia moment of trailer 50, and $\varphi t$ is the yaw angle of trailer 50 ($\dot{\varphi}t$ is the yaw angle velocity).

$\delta f$ is the steering angle of front wheels 11, 11 of vehicle 10, and $\delta r$ is the steering angle of rear wheels 12, 12 of vehicle 10.

$f_{xf}$ is the vertical tire force of front wheels 11, 11 of vehicle 10, and the positive direction thereof is the front direction of vehicle 10. $f_{yf}$ is the lateral tire force of front wheels 11, 11 of vehicle 10, and the positive direction thereof is the left direction of vehicle 10. $f_{xr}$ is the vertical tire force of rear wheels 12, 12 of vehicle 10, and the positive direction thereof is the front direction of vehicle 10. $f_{yr}$ is the lateral tire force of rear wheels 12, 12 of vehicle 10, and the positive direction thereof is the left direction of vehicle 10.

$f_{xh}$ is the vertical hitch force and its positive direction is the forward direction, and $f_{yh}$ is the lateral hitch force and its positive direction is the left direction.

$f_{xt}$ is the vertical tire force of traveling wheels 51, 51 of trailer 50 and its positive direction is the front direction of trailer 50, and $f_{yt}$ is the lateral tire force of traveling wheels 51, 51 of trailer 50, and its positive direction is the left direction of trailer 50.

$\varepsilon$ is a hitch angle.

Equations of motion of vehicle 10 are Equations 1.

$$m_v \ddot{x} = f_{xf} \cos \delta_f - f_{yf} \sin \delta_f + f_{xr} \cos \delta_r - f_{yr} \sin \delta_r + f_{xh}$$

$$m_v \ddot{y} = f_{xf} \sin \delta_f + f_{yf} \cos \delta_f + f_{xr} \sin \delta_r + f_{yr} \cos \delta_r + f_{yh}$$

$$J_{vzz}\ddot{\psi} = l_f(f_{xf} \sin \delta_f + f_{yf} \cos \delta_f) - l_r(f_{xr} \sin \delta_r + f_{yr} \cos \delta_r) - l_h f_{yh} \quad \text{(Equations 1)}$$

Equations of motion of trailer 50 are Equations 2.

$$m_t \ddot{x}_t = f_{xh} \cos \varepsilon + f_{yh} \sin \varepsilon + f_{xt}$$

$$m_t \ddot{y}_t = -f_{xh} \sin \varepsilon + f_{yh} \cos \varepsilon + f_{yt}$$

$$J_{tzz}\ddot{\psi}_t = l_{th}(-f_{xh} \sin \varepsilon + f_{yh} \cos \varepsilon) - l_{tr} f_{yt} \quad \text{(Equations 2)}$$

Here, the equations of motion are defined as in Equations 3.

$$M\ddot{\mathbb{x}} = \mathbb{B}_1 \mathbb{B}_1 + \mathbb{B}_{hv} \mathbb{u}_h$$

$$M_t \ddot{\mathbb{x}}_t = \mathbb{B}_2 \mathbb{B}_2 + \mathbb{B}_{ht} \mathbb{u}_h \quad \text{(Equations 3)}$$

Each variable in Equations 3 is as shown in Equations 4.

$$M = \begin{bmatrix} m_v & 0 & 0 \\ 0 & m_v & 0 \\ 0 & 0 & J_{vzz} \end{bmatrix} \quad \text{(Equations 4)}$$

$$\ddot{\mathbb{x}} = \begin{bmatrix} \ddot{x} \\ \ddot{y} \\ \ddot{\psi} \end{bmatrix}$$

$$\mathbb{B}_1 = \begin{bmatrix} \cos\delta_f & -\sin\delta_f & \cos\delta_r & -\sin\delta_r \\ \sin\delta_f & \cos\delta_f & \sin\delta_r & \cos\delta_r \\ l_f \sin\delta_f & l_f \cos\delta_f & -l_r \sin\delta_r & -l_r \cos\delta_r \end{bmatrix}$$

$$\mathbb{u}_1 = \begin{bmatrix} f_{xf} \\ f_{yf} \\ f_{xr} \\ f_{yr} \end{bmatrix}$$

$$\mathbb{B}_{hv} = \begin{bmatrix} 1 & 0 \\ 0 & 1 \\ 0 & -l_r \end{bmatrix}$$

$$\mathbb{u}_h = \begin{bmatrix} f_{xh} \\ f_{yh} \end{bmatrix}$$

$$M_t = \begin{bmatrix} m_t & 0 & 0 \\ 0 & m_t & 0 \\ 0 & 0 & J_{tzz} \end{bmatrix}$$

$$\ddot{\mathbb{x}}_t = \begin{bmatrix} \ddot{x}_t \\ \ddot{y}_t \\ \ddot{\psi}_t \end{bmatrix}$$

$$\mathbb{B}_2 = \begin{bmatrix} 1 & 0 \\ 0 & 1 \\ 0 & -l_{tt} \end{bmatrix}$$

$$\mathbb{u}_2 = \begin{bmatrix} f_{xt} \\ f_{yt} \end{bmatrix}$$

$$\mathbb{B}_{ht} = \begin{bmatrix} \cos\varepsilon & \sin\varepsilon \\ -\sin\varepsilon & \cos\varepsilon \\ -l_{th}\sin\varepsilon & l_{th}\cos\varepsilon \end{bmatrix}$$

Steering control device 30 can estimate the motion of trailer 50 according to Equation 6 by using the estimation result by the observer (state estimating unit) in Equation 5.

$$\hat{\mathbb{u}}_h = \frac{M\ddot{\mathbb{x}} - \mathbb{B}_1 \mathbb{u}_1}{\mathbb{B}_{hv}} \quad \text{(Equation 5)}$$

$$\ddot{\mathbb{x}}_t = \frac{\mathbb{B}_2 \mathbb{u}_2 + \mathbb{B}_{ht} \hat{\mathbb{u}}_h}{M_t} \quad \text{(Equation 6)}$$

Steering control device 30 performs trailer stabilization control (rear wheel steering control) based on the estimated motion of trailer 50.

FIG. 6 is a flowchart of a procedure of trailer stabilization control.

First, in step S501, steering control device 30 receives the driver operation information such as a front wheel steering angle δf.

In step S502, steering control device 30 receives the vehicle motion information such as the yaw rate and the vehicle speed of vehicle 10 detected by the onboard sensors.

In step S503, steering control device 30 calculates the theoretical vehicle response based on the driver operation information received in step S501, the actual vehicle response based on the vehicle motion information (onboard sensor information) received in step S502, and difference between the theoretical vehicle response and the actual vehicle response.

In step S504, steering control device 30 calculates the trailer external force (which is force Fh applied to hitch portion 19 from the side of trailer 50 and transmitted to vehicle 10) based on the difference between the theoretical vehicle response and the actual vehicle response.

In step S505, steering control device 30 receives information on the relative position of trailer 50 with respect to vehicle 10 from second external sensor 18.

In step S506, steering control device 30 estimates the trailer state such as the yaw rate of trailer 50 based on the trailer external force calculated in step S504 and the relative position of trailer 50 with respect to vehicle 10.

In step S507, steering control device 30 calculates the difference between the yaw rate of vehicle 10 and the yaw rate of trailer 50, and determines whether or not the absolute value of the calculated difference exceeds the threshold value.

Here, when the absolute value of the calculated difference between the yaw rate of vehicle 10 and the yaw rate of trailer 50 does not exceed the threshold value, the process returns to step S501, and steering control device 30 does not perform trailer stabilization control.

On the other hand, when the absolute value of the calculated difference between the yaw rate of vehicle 10 and the yaw rate of trailer 50 exceeds the threshold value and when it is necessary to suppress the yaw motion of trailer 50 so as to improve the stability of the vehicle combination, in step S508, steering control device 30 calculates the hitch force (trailer motion compensating hitch force) for suppressing the yaw motion of trailer 50.

The process proceeds to step S509, steering control device 30 generates the hitch force calculated in step S508 and calculates the front-rear steering distribution ratio so as to maintain the vehicle traveling direction based on the angle information of steering wheel 13 operated by driver 20.

When steering control device 30 determines that the generation of the hitch force and the maintaining of the vehicle traveling direction cannot be performed at the same time based on the magnitude of the hitch force calculated in step S508, steering control device 30 can set the front-rear steering distribution ratio to prioritize the generation of the hitch force.

In addition, it is possible for the driver to set the balance between the generation of the hitch force and the maintaining of the vehicle traveling direction in advance, and steering control device 30 adopts the front-rear steering distribution ratio according to the balance.

The process proceeds to step S510, steering control device 30 calculates a target front wheel steering angle δf (first steering angle command) and a target rear wheel steering angle δr (second steering angle command) based on the front-rear steering distribution ratio calculated in step S509.

Next, the process proceeds to step S511, steering control device 30 controls front wheel steering device 14 and rear wheel steering device 16 (steering actuators) based on the target front wheel steering angle δf and the target rear wheel steering angle δr.

Furthermore, steering control device 30 controls the motion of trailer 50 by the rear wheel steering control so that the difference between the yaw rate of vehicle 10 and the yaw rate of trailer 50 becomes small.

FIG. 7 is a flowchart of a procedure of setting the front-rear steering distribution ratio based on the hitch force in the trailer stabilization control.

In step S601, steering control device 30 reads the hitch force calculated in step S508, and in step S602, steering control device 30 determines whether the absolute value of the hitch force exceeds the threshold value.

When the absolute value of the hitch force exceeds the threshold value, the process proceeds to step S603, steering control device 30 adopts A2 as the front-rear steering distribution ratio that prioritizes the generation of the hitch force over the maintenance of the traveling direction of the vehicle 10.

On the other hand, when the absolute value of the hitch force does not exceed the threshold value, the process proceeds to step S604, steering control device 30 determines whether the driver has previously set the balance between the generation of the hitch force and the maintenance of the traveling direction of vehicle 10 (whether there is a driver-set value).

When the driver-set value for determining the balance between the generation of the hitch force and the maintenance of the traveling direction of vehicle 10 based on the angle information of steering wheel 13 operated by driver 20, is set, the process proceeds to step S605, steering control device 30 adopts A3 as the front-rear steering distribution ratio that provides the balance (driver-set value) between the generation of the hitch force and the maintenance of the vehicle traveling direction based on the angle information of steering wheel 13 operated by driver 20.

On the other hand, when the driver set value for determining the balance between the generating of the hitch force and the maintenance of the traveling direction of vehicle 10 based on the angle information of steering wheel 13 operated by driver 20, is not set, the process proceeds to step S606, steering control device 30 adopts A1 as the front-rear steering distribution ratio for generating the hitch force and maintaining the vehicle traveling direction based on the angle information of steering wheel 13 operated by driver 20.

FIG. 8 a time chart of examples of changes in the yaw rate and the rear wheel steering angle when steering control device 30 performs the trailer stabilization control.

When the driver of vehicle 10 operates steering wheels 13 and the front wheel steering angle δf varies, the yaw rate of the theoretical vehicle when vehicle 10 alone travels (theoretical vehicle responses) which is calculated by steering control device 30 based on the vehicle speed and vehicle characteristics, varies in response to the change of the front wheel steering angle δf.

When trailer 50 is coupled to the vehicle 10, the actual yaw rate of vehicle 10 behaves differently from the theoretical vehicle yaw rate because vehicle 10 receives external force from trailer 50 (trailer external force), and when the oscillating motion of trailer 50 is generated, the trailer external force periodically fluctuates and the actual yaw rate of vehicle 10 also periodically fluctuates.

At that time, the estimated value of the yaw rate of trailer 50 calculated by steering control device 30 indicates a fluctuation in response to the trailer external force.

Here, steering control device 30 calculates the difference between the theoretical vehicle yaw rate and the estimated yaw rate of the trailer, and when the difference exceeds the threshold value, steering control device 30 outputs the commands to the front and rear wheel steering angles for generating the periodic yaw moment having a phase opposite to the oscillating motion. That is, steering control device 30 generates the periodic yaw moment having a phase opposite to the oscillating motion according to both the first steering angle command of front wheels 11, 11 and the second steering angle command of rear wheels 12, 12.

The abovementioned steering control stabilizes the yaw rate of trailer 50.

In the trailer stabilization control by steering control device 30, since the steering angle of front wheels 11, 11 and the steering angle of rear wheels 12, 12 are controlled, it is possible to suppress changes in the speed of vehicle 10 according to the trailer stabilization control.

Also, since the yaw moment that can be generated by controlling the steering angle is greater than the yaw moment that can be generated by the automatic braking, comparing the yaw moment generated by the automatic braking, the yaw moment generated by controlling the steering angle can stabilize the traveling of vehicle 10 to which a large trailer 50 is coupled.

Furthermore, by changing the distribution of the yaw moment generated at the front and rear wheels, it is possible to generate the yaw moment by controlling the steering angle without changing the vehicle traveling direction.

Technical concepts of the foregoing embodiment may be freely combined so long as there is no conflict.

The present invention has been specifically described with reference to the preferred embodiment. It will be easily understood by those skilled in the art that it is possible to provide various modifications based on basic technical concepts and teachings of the present invention.

In the control system for the trailer stabilization, it is possible to suppress the yaw motion of trailer 50 by performing the front-rear wheels steering control and the automatic braking control by steering control device 30. Furthermore, in the control system for the trailer stabilization, when the yaw moment generated in the front-rear wheel steering control by the steering control device 30 is insufficient to suppress the yaw motion of trailer 50, the yaw moment generated by the automatic braking can also be applied.

Furthermore, front wheel steering device 14 is not limited to the steer-by-wire steering device, and front wheel steering device 14 may be a power steering device provided with an actuator for generating the steering force, and in the power steering device, wheel steering 13 is mechanically connected to front wheels 11, 11.

When vehicle 10 is provided with the power steering device, the angle of steering wheel 13 is changed in response to the control of the front wheel steering angle in the control system for the trailer stabilization, and the change of the steering wheel angle may cause discomfort to the driver. However, the driver may recognize that the oscillating motion of the vehicle combination has occurred based on the change in the angle of steering wheel 13.

That is, when steering control device 30 executes the trailer stabilization control in vehicle 10 provided with the power steering device, the front wheel steering angle command (first steering angle command) in the trailer stabilization control is a modified steering angle command for changing the steering angle of steering wheel 13.

On the other hand, when vehicle 10 is provided with the steer-by-wire steering device, even if the front wheel steering angle changes in the trailer stabilization control, the steering angle of steering wheel 13 does not change, and thus, it is possible to prevent the driver from feeling discomfort.

REFERENCE SYMBOL LIST

10 Vehicle
11, 11 Front wheels
12, 12 Rear wheels
14 Front wheel steering device (front wheel steering control unit)
16 Rear wheel steering device (rear wheel steering control unit)
18 Second external sensor 18 (external sensing unit)
19 Hitch portion 19
30 Steering control device (steering control unit)
31 Information processing unit (vehicle motion state receiving unit)

The invention claimed is:

1. A steering control device for controlling a vehicle towing a trailer, the steering control device that:
   receives information on yaw motion of the trailer;
   calculates target hitch force required to be generated at a hitch portion, by which the vehicle and the trailer are coupled, to generate a periodical yaw moment having a phase opposite to the yaw motion of the trailer based on the received information on the yaw motion of the trailer;
   calculates a front-rear steering distribution ratio based on the calculated target hitch force;
   calculates a first steering angle command for controlling a steering angle of front wheels of the vehicle and a second steering angle command for controlling a steering angle of rear wheels of the vehicle based on the calculated target hitch force and front-rear steering distribution ratio;
   outputs the first steering angle command to a front wheel steering control unit for controlling the steering angle of the front wheels, and outputs the second steering angle command to a rear wheel steering control unit for controlling the steering angle of the rear wheels; and
   adopts the front-rear steering distribution ratio that prioritizes the generation of the target hitch force over maintenance of a traveling direction of the vehicle when the target hitch force exceeds a threshold value, compared to when the target hitch force is equal to or less than the threshold value.

2. The steering control device according to claim 1, wherein the front wheel steering control unit is a steer-by-wire steering device.

3. The steering control device according to claim 1, which calculates the yaw motion of the trailer based on external force of the trailer applied to a hitch portion by which the vehicle and the trailer are coupled to each other and information on external sensing information obtained by external sensing units.

4. The steering control device according to claim 3, wherein the external sensing unit: measures the motion of the trailer; estimates force transmitted from a road surface to traveling wheels of the trailer based on information on the motion of the trailer; and calculates the yaw motion of the trailer based on the external force of the trailer applied to the hitch portion and the force transmitted from the road surface to the traveling wheels of the trailer.

5. The steering control device according to claim 1, which adopts the front-rear steering distribution ratio that provides balance between the generation of the target hitch force and the maintenance of the vehicle traveling direction set by a driver when the absolute value of the target hitch force is equal to or less than the threshold value.

6. A steering control method performed by a steering control device provided to a vehicle towing a trailer, comprising:
   receiving information on yaw motion of the trailer;
   calculating target hitch force required to be generated at a hitch portion, by which the vehicle and the trailer are coupled, to generate a periodical yaw moment having a phase opposite to the yaw motion of the trailer based on the received information on the yaw motion of the trailer;
   calculating a front-rear steering distribution ratio based on the calculated target hitch force;
   calculating a first steering angle command for controlling a steering angle of front wheels of the vehicle and a second steering angle command for controlling a steering angle of rear wheels of the vehicle based on the calculated target hitch force and front-rear steering distribution ratio; and
   outputting the first steering angle command to a front wheel steering control unit for controlling the steering angle of the front wheels, and outputting the second steering angle command to a rear wheel steering control unit for controlling the steering angle of the rear wheels,
   wherein the step of calculating a front-rear steering distribution ratio includes a step of adopting the front-rear steering distribution ratio that prioritizes the generation of the target hitch force over maintenance of a traveling direction of the vehicle when the target hitch force exceeds a threshold value, compared to when the target hitch force is equal to or less than the threshold value.

7. The steering control method according to claim 6, wherein the step of calculating a front-rear steering distribution ratio further includes a step of adopting the front-rear steering distribution ratio that provides balance between the generation of the target hitch force and the maintenance of the vehicle traveling direction set by a driver when the absolute value of the target hitch force is equal to or less than the threshold value.

8. A steering control system for controlling a vehicle towing a trailer, comprising:
   a vehicle motion state receiving unit for obtaining information on motion state of the vehicle;
   an external sensing unit for obtaining external sensing information of the vehicle;
   a steering control unit for:
     receiving information on yaw motion of the trailer which occurs in a vehicle combination composed of the vehicle and the trailer based on the information on the motion state of the vehicle received by the vehicle motion state receiving unit and the information on the external sensing information of the vehicle sensed by the external sensing unit;
     calculating target hitch force required to be generated at a hitch portion, by which the vehicle and the trailer are coupled, to generate a periodical yaw moment having a phase opposite to the yaw motion of the trailer based on the received information on the yaw motion of the trailer;

calculating a front-rear steering distribution ratio based on the calculated target hitch force;

outputting a first steering angle command for controlling a steering angle of front wheels of the vehicle and a second steering angle command for controlling a steering angle of rear wheels of the vehicle, which are calculated based on the calculated target hitch force and front-rear steering distribution ratio; and adopting the front-rear steering distribution ratio that prioritizes the generation of the target hitch force over maintenance of a traveling direction of the vehicle when the target hitch force exceeds a threshold value, compared to when the target hitch force is equal to or less than the threshold value, a front wheel steering device for receiving the first steering angle command output from the steering control unit to control the steering angle of the front wheels of the vehicle; and a rear wheel steering device for receiving the second steering angle command output from the steering control unit to control the steering angle of the rear wheels of the vehicle.

9. The steering control system according to claim 8, wherein the steering control unit adopts the front-rear steering distribution ratio that prioritizes the generation of the target hitch force over maintenance of a traveling direction of the vehicle when the target hitch force exceeds a threshold value, compared to when the target hitch force is equal to or less than the threshold value.

* * * * *